(12) United States Patent
Tanase et al.

(10) Patent No.: US 6,749,216 B2
(45) Date of Patent: Jun. 15, 2004

(54) HEAD PROTECTING AIR BAG DEVICE

(75) Inventors: Toshinori Tanase, Nishikasugai-gun (JP); Tetsuya Ogata, Nishikasugai-gun (JP); Hiroyuki Takahashi, Toyota (JP); Kenji Ogata, Toyota (JP)

(73) Assignee: Toyoda Gosei Co., LTD, Aichi (JP)

( * ) Notice: Subject to any disclaimer, the term of this patent is extended or adjusted under 35 U.S.C. 154(b) by 87 days.

(21) Appl. No.: 10/058,289

(22) Filed: Jan. 30, 2002

(65) Prior Publication Data

US 2002/0105174 A1 Aug. 8, 2002

(30) Foreign Application Priority Data

Feb. 5, 2001 (JP) ..................... P.2001-028019
Apr. 27, 2001 (JP) ..................... P.2001-132050

(51) Int. Cl.⁷ .................... B60R 21/22; B60R 21/26
(52) U.S. Cl. ............... 280/730.2; 280/740; 280/742
(58) Field of Search ................... 280/730.2, 742, 280/740, 730.1, 736

(56) References Cited

U.S. PATENT DOCUMENTS

| | | | | |
|---|---|---|---|---|
| 3,856,180 A | * | 12/1974 | Merrell ........................ 225/5 |
| 5,316,336 A | * | 5/1994 | Taguchi et al. .......... 280/730.2 |
| 6,070,903 A | * | 6/2000 | Beisswenger et al. ...... 280/736 |
| 6,073,961 A | * | 6/2000 | Bailey et al. ............. 280/730.2 |
| 6,293,581 B1 | * | 9/2001 | Saita et al. .............. 280/730.2 |
| 6,299,200 B1 | * | 10/2001 | Bowers et al. ........... 280/730.2 |
| 6,318,754 B1 | * | 11/2001 | Einsiedel et al. ........... 280/736 |
| 6,386,581 B1 | * | 5/2002 | Ohno ......................... 280/735 |

FOREIGN PATENT DOCUMENTS

JP   2000-127886   5/2000

* cited by examiner

Primary Examiner—David Dunn
(74) Attorney, Agent, or Firm—Posz & Bethards, PLC (57) ABSTRACT

To reduce damaging of an inner tube in the vicinity of a gas ejection port of an inflator. To the peripheral portion near an end on a gas ejection port side of an inflator, one end of a pipe is fixed. The pipe extends in the axial direction of an inner tube having such flexibility as a cloth, is smaller in the diameter, shorter and higher in rigidity than the inner tube. In the pipe, its leading end is thinner than a part that is an outer portion of the gas ejection port of the inflator. Further, at the peripheral portion of the end of the pipe, a rear-leading end of the inner tube is clamped by a clamp.

8 Claims, 11 Drawing Sheets

HEAD PROTECTING AIR BAG DEVICE

CROSS REFERENCE TO RELATED APPLICATION

The present application is based on Japanese Patent Applications No. 2001-28019 and No. 2001-132050, the entire contents of which are incorporated herein by reference.

BACKGROUND OF THE INVENTION

The present invention relates to a head protecting air bag device, and particularly to a head protecting air bag device having a bag body which expands and develops in the shape of a curtain in the longitudinal direction of a vehicle body on a cabin side.

Conventionally, in a head protecting air bag device having a bag body which expands and develops in the shape of a curtain in the longitudinal direction of a vehicle body on a cabin side, as disclosed in Japanese Patent Publication JP-A-2000-127886, a cloth-made inner tube in which gas outlet holes are formed at the predetermined distance in the forward and backward direction of the vehicle body is provided in a gas passage that is formed at the upper portions of a front seat expansion room and a rear seat expansion room of the bag body and extends axially in the forward and backward direction of the vehicle body, and expansion gas is supplied uniformly to each expansion room of the bag body. In such the head protecting air bag device, since the cloth-made inner tube provided in the bag body can be folded simultaneously with the bag body, this device is advantageous to reduce a housing space.

However, in this head protecting air bag device, when the bag body expands and develops, the inner tube folded must be spread by gas pressure. Further, in the vicinity of a gas ejection port of an inflator, the diffusion pressure of expansion gas is strong. Therefore, the inner pressure of the inner tube in the vicinity of the gas ejection port of the inflator becomes temporarily high very much, so that the inner tube is frequently damaged.

SUMMARY OF THE INVENTION

An object of the invention is, in view of the above facts, to obtain a heat protecting air bag device in which damaging of an inner tube in the vicinity of a gas ejection port in an inflator can be reduced.

According to the first aspect of the invention, there is provided a head protecting air bag device comprising: a bag body forming at least one expansion room and a gas passage extending in the longitudinal direction of a vehicle body communicating to the expansion room; an inflator which ejects expansion gas in the bag body; a flexible inner tube provided in the gas passage and for supplying the expansion gas into the expansion room; and a pipe coupled to a gas ejection port of the inflator and extending in an axial direction of the inner tube, a leading end of the pipe protruding into the inner tube.

Accordingly, when the inflator operates, the expansion gas from the inflator is supplied through a gas outlet hole of the inner tube to the expansion rooms of the bag body, and the bag body develops in the shape of a curtain thereby to protect the head of the occupant. At this time, the pipe having the small length and the small diameter provided in the inner tube rectifies the expansion gas ejected from the gas ejection port of the inflator. As a result, the inner tube folded is easily spread by the expansion gas, and the diffusion of the expansion gas becomes weaker at the outlet of the pipe than at the gas ejection port of the inflator. Therefore, since it is possible to prevent the inner pressure of the inner tube in the vicinity of the gas ejection port of the inflator from temporarily becoming high very much, damaging of the inner tube can be reduced. Further, since the pipe is short, the convenience of housing the bag body in the device is not greatly worsened.

According to the second aspect of the invention, in the head protecting air bag device according to the first aspect, there is provided a deflecting portion which deflects the ejecting direction of the expansion gas ejecting from a leading end of the pipe to the opposite side to a sewed portion of the inner tube.

Accordingly, in addition to the contents of the first aspect, since the sewed portion side of the inner tube is weak in tear strength due to the existence of machine stitches, the ejecting direction of the expansion gas ejecting from the leading end of the pipe is deflected by the deflecting portion to the opposite side to the sewed portion of the inner tube, whereby the amount of the gas ejection to the sewed portion is suppressed. As a result, damaging on the sewed portion side that is weak in the tear strength can be reduced effectively.

According to the third aspect of the invention, in the head protecting air bag device according to the second aspect, the deflecting portion is the leading end of the pipe cut slantingly.

Accordingly, in addition to the contents of the second aspect, by only such a small modification that the leading end of the pipe is cut slantingly, damaging on the sewed portion side that is weak in the tear strength can be reduced effectively.

According to the fourth aspect of the invention, in the head protecting air bag device according to the first aspect, an axis of the inflator in the mounting position is offset with respect to an axis of the leading end of the pipe in vertical direction, and a bending portion is formed at a part of the pipe that is near the gas ejection port of the inflator.

Accordingly, in addition to the contents of the first aspect, since the axis of the inflator in the mounting position is offset with respect to the axis of the pipe in vertical direction and their axes are not on a line, in case that the pipe is bent halfway, a loss in pressure becomes large, so that this device is disadvantageous to secure an expansion development time of the bag body and the inner pressure in the bag body. Therefore, the bending portion is formed at a part of the pipe that is near the gas ejection port of the inflator, whereby the loss in pressure caused by bending of the pipe can be reduced.

According to the fifth aspect of the invention, in a head protecting air bag device comprising an inflator which ejects expansion gas in a bag body, a gas passage which communicates to expansion rooms for protecting a head of an occupant and the upsides of the expansion rooms and extends in the longitudinal direction of a vehicle body, and a flexible inner tube, which is provided in the gas passage and supplies the expansion gas into the expansion rooms, there is provided a high-voltage resistant flexible tube having a small length and a small diameter is provided, which protrudes axially from the inflator into the inner tube.

Accordingly, when the inflator operates, the expansion gas from the inflator is supplied through a gas outlet hole of the inner tube to the expansion rooms of the bag body, and the bag body develops in the shape of a curtain thereby to protect the head of the occupant. At this time, the high-voltage resistant flexible tube having the small length and the small diameter, which protrudes axially from the inflator into the inner tube, rectifies the expansion gas ejected from the gas ejection port of the inflator. As a result, the inner tube folded by the expansion gas is easily spread, and the diffusion of the expansion gas becomes weaker at the outlet of the high-voltage resistant flexible tube than at the gas ejection port of the inflator. Therefore, since it is possible to prevent the inner pressure of the inner tube in the vicinity of the gas ejection port of the inflator from temporarily becoming high very much, damaging of the inner tube can be reduced. Further, since the high-voltage resistant flexible tube is used, it can be folded up in flat, so that deterioration of convenience of housing the bag body in the device can be further suppressed.

According to the sixth aspect of the invention, in a head protecting air bag device comprising an inflator which ejects expansion gas in a bag body, a gas passage which communicates to expansion rooms for protecting a head of an occupant and the upsides of the expansion rooms and extends in the longitudinal direction of a vehicle body, and a flexible inner tube, which is provided in the gas passage and supplies the expansion gas into the expansion rooms, there is provided a high-voltage resistant flexible tube having a small length and a small diameter is provided, which protrudes axially from the inflator into the gas passage in the bag body, and the inner tube is covered with the high-voltage resistant flexible tube so that the inner tube is narrowed.

Accordingly, when the inflator operates, the expansion gas from the inflator is supplied through a gas outlet hole of the inner tube to the expansion rooms of the bag body, and the bag body develops in the shape of a curtain thereby to protect the head of the occupant. At this time, the high-voltage resistant flexible tube having the small length and the small diameter, which protrudes axially from the inflator into the inner tube, rectifies the expansion gas ejected from the gas ejection port of the inflator. As a result, the inner tube folded by the expansion gas is easily spread, and the diffusion of the expansion gas becomes weaker at the outlet of the high-voltage resistant flexible tube than at the gas ejection port of the inflator. Therefore, since it is possible to prevent the inner pressure of the inner tube in the vicinity of the gas ejection port of the inflator from temporarily becoming high very much, damaging of the inner tube can be reduced. Further, since the high-voltage resistant flexible tube is used, it can be folded up in flat, so that deterioration of the convenience of housing the bag body in the device can be further suppressed. Further, since the inner tube is covered with the high-voltage resistant flexible tube so that the inner tube is narrowed, the high-voltage resistant flexible tube is not directly exposed to the expansion gas by the inner tube located inside. As a result, since high-temperature resistance of the high-voltage resistant flexible tube can be lowered, a cost can be reduced.

According to the seventh aspect of the invention, in the head protecting air bag device according to any of the first to sixth aspects, an inner diameter of the pipe having the small length and the small-diameter or the high-voltage resistant flexible tube is smaller than an outer diameter of the ejection part of the inflator, and the pipe or the tube does not extend over a gas outlet hole in the inner tube that is nearest to the inflator.

Accordingly, in addition to the contents of any of the first to sixth aspects, the expansion gas can be reliably blown also into the gas outlet hole in the inner tube that is nearest to the inflator.

DETAILED DESCRIPTION OF THE PREFERRED EMBODIMENTS

A first embodiment of a head protecting air bag device according to the invention will be described with reference to FIGS. 1 to 3.

In the figures, a reference character FR represents a vehicle forward direction, a reference character UP represents a vehicle upward direction, and a reference character IN represents a width inside direction.

Figure 3:
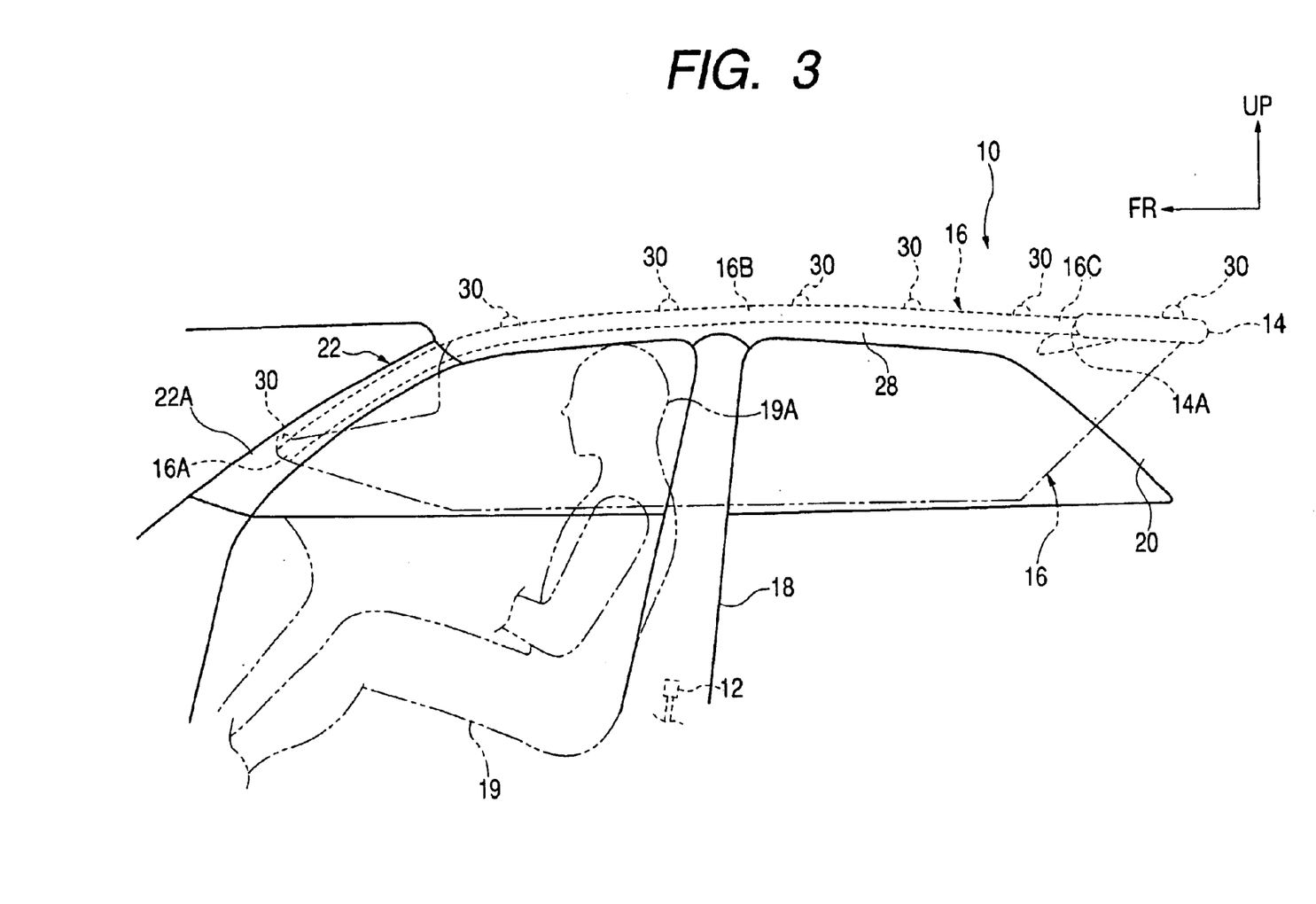
FIG. 3 is a schematic side view showing the head protecting air bag device according to the first embodiment of the invention.

As shown in FIG. 3, a head protecting air bag device 10 according to this embodiment includes mainly a sensor 12 for detecting side-crash or a roll over state, an inflator 14 which operates to eject gas, and a bag body 16. The sensor 12 is disposed, for example, in the vicinity of a lower end of a center pillar 18 (B pillar)

The inflator 14 is disposed at a quarter pillar (C pillar) 20 and connected to the sensor 12. Accordingly, when the sensor 12 detects the side-crash or the roll over state, the inflator 14 operates.

The bag body 16 develops by gas flowing from the inflator 14 along the cabin side as shown by chain double dotted lines in FIG. 3, and protects a head 19A of an occupant 19 on a front seat and a head of an occupant on a rear seat. The bag body 16 is folded long in the shape of a bellows, and accommodated astride a front pillar (A pillar) garnish, a roof head lining, and a C pillar garnish. Its front-end 16A is arranged in the vicinity of the lower portion of an inclined portion 22A of an A pillar 22. Further, a central portion 16B of the bag body 16 is arranged along the A pillar 22 and a roof side rail 28.

Figure 2:
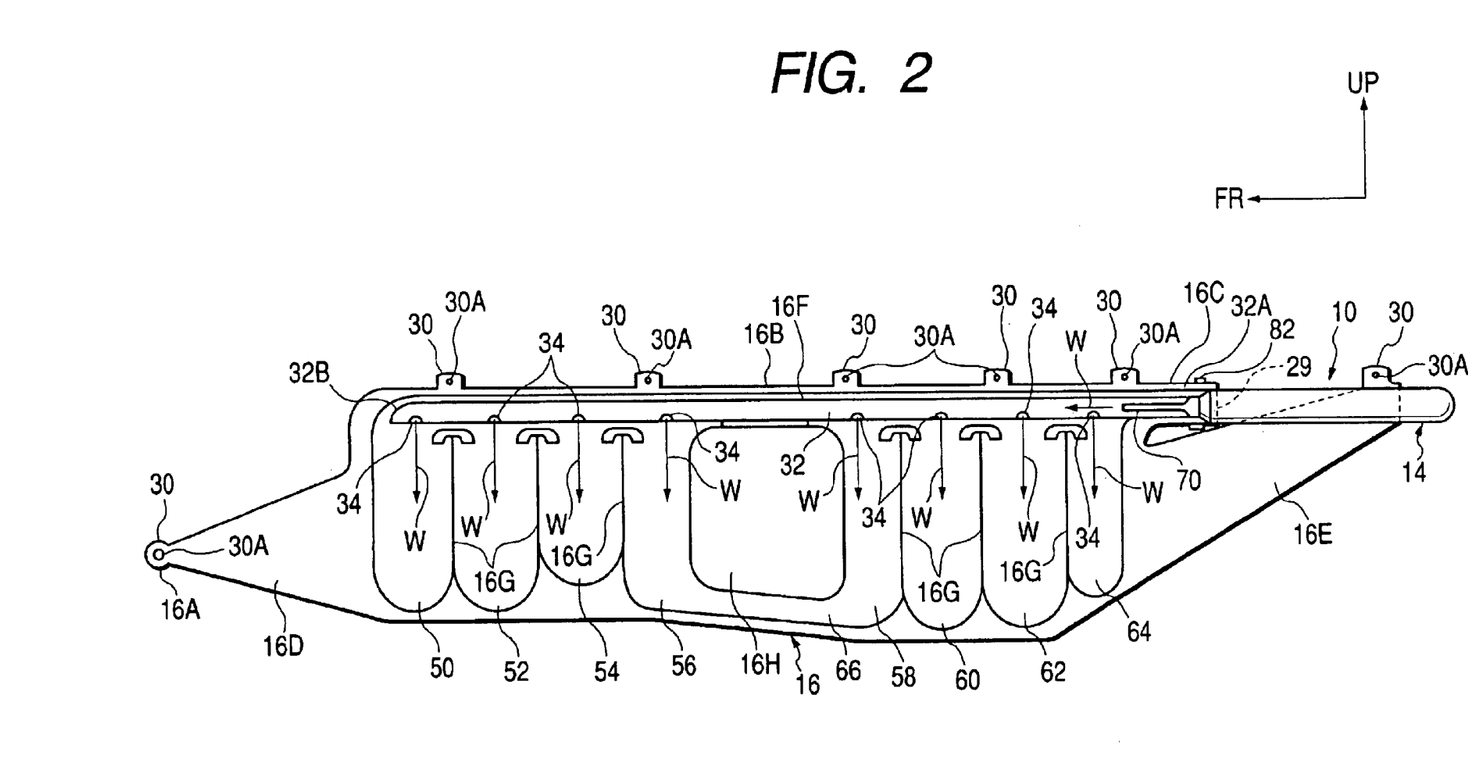
FIG. 2 is a sectional side view showing a bag body in the head protecting air bag device according to the first embodiment of the invention.

As shown in FIG. 2, the bag body 16 is manufactured by double weaving using polyamide thread or polyester thread, and a connection port 29 through which expansion gas from the inflator 14 is led to the inside of the bag body 16 is formed at an upper edge rear end 16C. Further, at the upper portion of each leading end of triangular plate-shaped portions 16D and 16E that are formed at front and back ends of the bag body 16, and at the upper edge of the central portion 16B of the bag body 16, plural attaching members 30 in which attaching holes 30A are formed are formed projectingly.

To a gas ejection port 14A of the inflator 14, a rear end 32A of an inner tube 32 provided inside the connection port 29 is coupled. This inner tube 32 is provided in a gas passage 16F formed at the upper edge in the bag body 16 in the longitudinal direction, that is, in the forward and backward direction of a vehicle body, and a front leading end 32B on the opposite side to the inflator 14 is blocked up. Further, the inner tube 32 is composed of a cloth using polyamide thread or polyester thread.

In the inner tube 32, gas outlet holes 34 are formed at the predetermined distance in the longitudinal direction, that is, in the forward and backward direction of the vehicle body. Below the respective gas outlet holes 34, plural expansion rooms 50, 52, 54, 56, 58, 60, 62, and 64 are formed, which are defined by the front triangular plate-shaped portion 16D, longitudinal stick-shaped coupling members 16G, a central rectangular plate-shaped portion 16H, longitudinal stick-shaped coupling members 16G, and the rear triangular plate-shaped portion 16E. The expansion rooms 56 and 58 adjacent to each other at the central portion in the longitudinal direction are coupled to each other at their lower ends by a communication portion 66.

Figure 1:
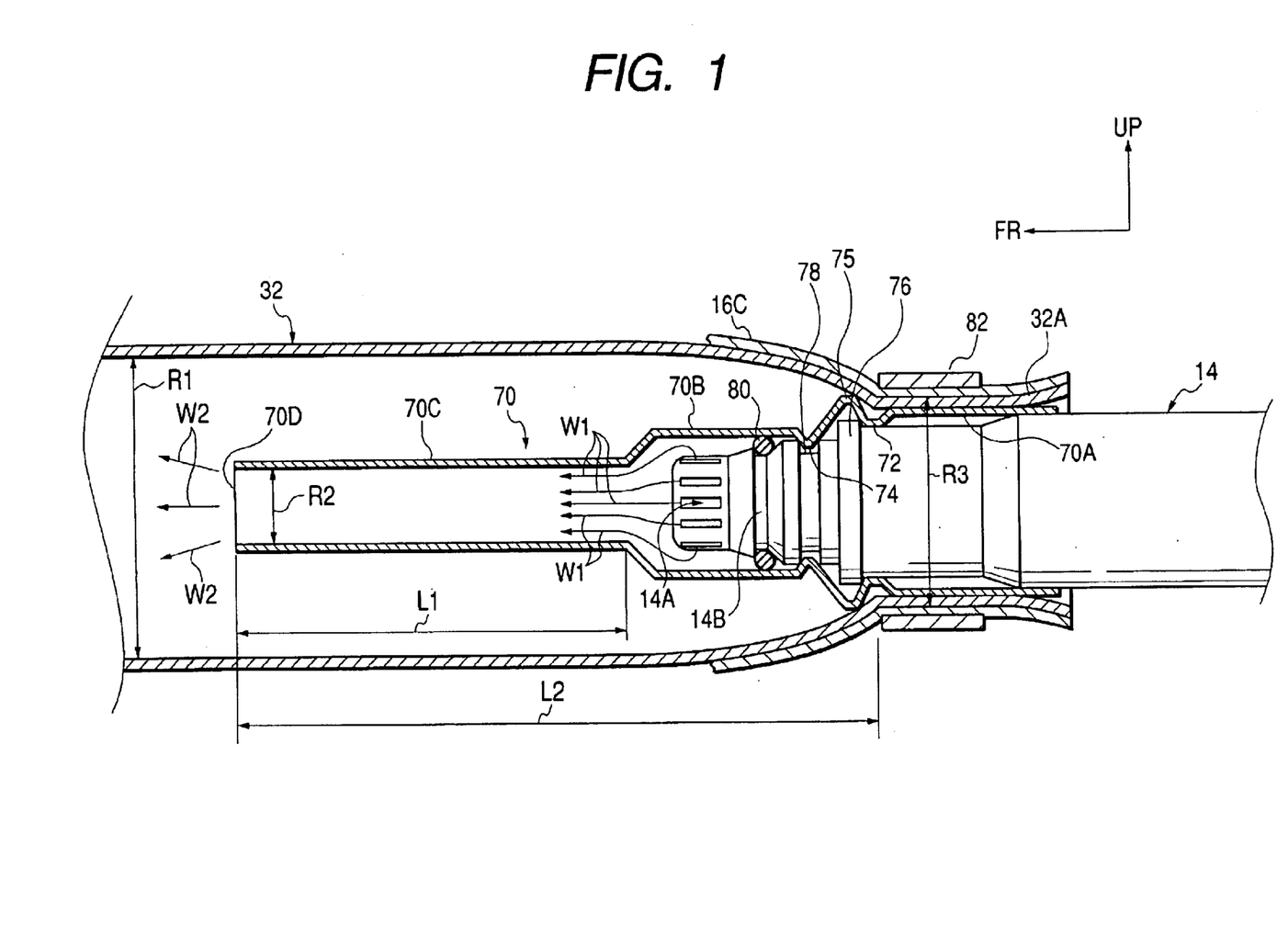
FIG. 1 is a sectional side view showing a main portion in a head protecting air bag device according to a first embodiment of the invention.

As shown in FIG. 1, one end (rear end) 70A of a pipe 70, extending in the axial direction of the inner tube 32 (in the longitudinal direction of the vehicle body) is smaller in a diameter and shorter than the inner tube 32, and has high rigidity (for example, it is made of metal), is fixed to the peripheral portion in the vicinity of the end on the gas ejection port 14A side of the inflator 14. Further, an inner diameter of the pipe 70 is smaller than an outer diameter of the ejection part of the inflator 14, and the pipe does not extend over a gas outlet hole 34 in the inner tube 32 which is nearest to the inflator 14.

Further, at a rear end 70A of the pipe 70, fitting protrusions 72 and 74 are formed by caulking in the surrounding direction, and these fitting protrusions 72 and 74 fit to a flange 76 and a recess portion 78 that are formed at the peripheral portion of the inflator 14. These fitting protrusions 72 and 74 function as a positioning member for the inflator 14 and also as a slip-stopper of the pipe 70 in the forward direction (in the direction where the pipe separates from the inflator 70) when the bag is expanded. Further, a large diameter portion 75 adjacent to the forward side of the fitting protrusion 72 functions as a slip-stopper of the inner tube 32 and bag body 16 in the forward direction (in the direction where the inner tube and the bag body separate from the inflator 70) at the bag expansion time. Further, the fitting protrusion 72 is used in order to prevent, when the inner tube 32 and the bag body 16 are clamped, the corresponding rear end 70A of the pipe 70 from deforming partially.

Further, between a part 14B of the inflator 14 which is adjacent to the gas ejection port 14A and the inner surrounding of the pipe 70, a seal member 80 is held. Further, in the pipe 70, its leading end 70 is thinner than a part 70B that becomes the peripheral portion of the gas ejection port 14A of the inflator 14.

Further, at the peripheral portion of the rear end 70A of the pipe 70, a rear leading end 32A of the inner tube 32 is clamped by a clamp 82, and also the vicinity of the upper edge rear end of the bag body 16 is simultaneously clamped by the clamp 82.

In case that an inner diameter R1 of the inner tube 32 is 50 mm and an inner diameter R2 of the pipe 70 is 10 mm, tests were performed with a length L1 of the leading end 70C of the pipe 70 set to 10 mm to 150 mm. According to the test, in case that a clamp diameter R3 is smaller than an outer diameter of the inner tube 32, a length L2, which is a length from a leading end outlet 70D of the pipe 70 to the clamp position of the inner tube 32, should be set to 80 mm or more in order to expand the inner tube 32 reliably. Further, the length of the pipe 70 varies according to the relation among the inner diameter R1 of the inner tube 32, the inner diameter R2 of the pipe 70 and the clamp diameter R3. The smaller the inner diameter R1 of the inner tube 32 is, the longer the length of the pipe 70 must be made, and the larger the inner diameter R1 of the inner tube 32 is, the shorter the length of the pipe 70 must be made. Further, in case that the leading end 70D of the pipe 70 exceeds a gas outlet hole 34 in the inner tube 32 which is nearest to the inflator 14, the development of the expansion room 64 in the bag body 16 located downward of this gas outlet port 34 and nearest to the inflator becomes late (in case that the lower portion of the expansion room 64 is communicated with the adjacent forward expansion room 62, the delay in the development of the expansion room 64 can be prevented). Therefore, it is preferable that the leading end 70D of the pipe 70 does not exceed the gas outlet hole 34 in the inner tube 32 which is nearest to the inflator 14.

Specifically, in case that the inner diameter R1 of the inner tube 32 is 30 mm or more, the inner diameter R2 of the pipe 70 is set to a third the size of R1 and less, for example, 8 to 15 mm, the length L1 of the leading end 70C of the pipe 70 is set to 50 mm or more, and the length L2 from the leading end outlet 70D of the pipe 70 from the clamp position of the inner tube 32 is set to 80 mm or more.

Next, the working of this embodiment will be described.

In this embodiment, when the inflator 14 operates, the expansion gas from the inflator 14, as shown by an arrow W in FIG. 2, passes through the inner tube 32 and is supplied through each gas outlet hole 34 to each of the expansion rooms 50, 52, 54, 56, 58, 60, 62 and 64 of the bag body 16. In result, the bag body 16, as shown by the chain double dotted lines in FIG. 3, develops in the shape of the curtain thereby to protect the head 19A of the occupant 19.

At this time, by the pipe 70 having high rigidity provided in the inner tube 32, the expansion gas (shown by an arrow W1 in FIG. 1) ejected from the gas ejection port 14A in the inflator 14 is rectified. In result, the inner tube 32 folded is easily spread by the expansion gas and the diffusion of the expansion gas (shown by an arrow W2 in FIG. 1) becomes weaker at the outlet 70D of the pipe 70 than at the gas ejection port 14A of the inflator 14. Therefore, since it is possible to prevent the inner pressure of the inner tube 32 in the vicinity of the outlet 70D of the pipe 70 from temporarily increasing very much, damaging of the inner tube 32 can be reduced.

Further, since the length of the pipe 70 having the high rigidity, and particularly the protruding length L1 from the gas ejection port 14A of the inflator 14 is shorter than the length of the inner tube 32, the convenience of housing the bag body 16 is not greatly worsened.

Figure 4:
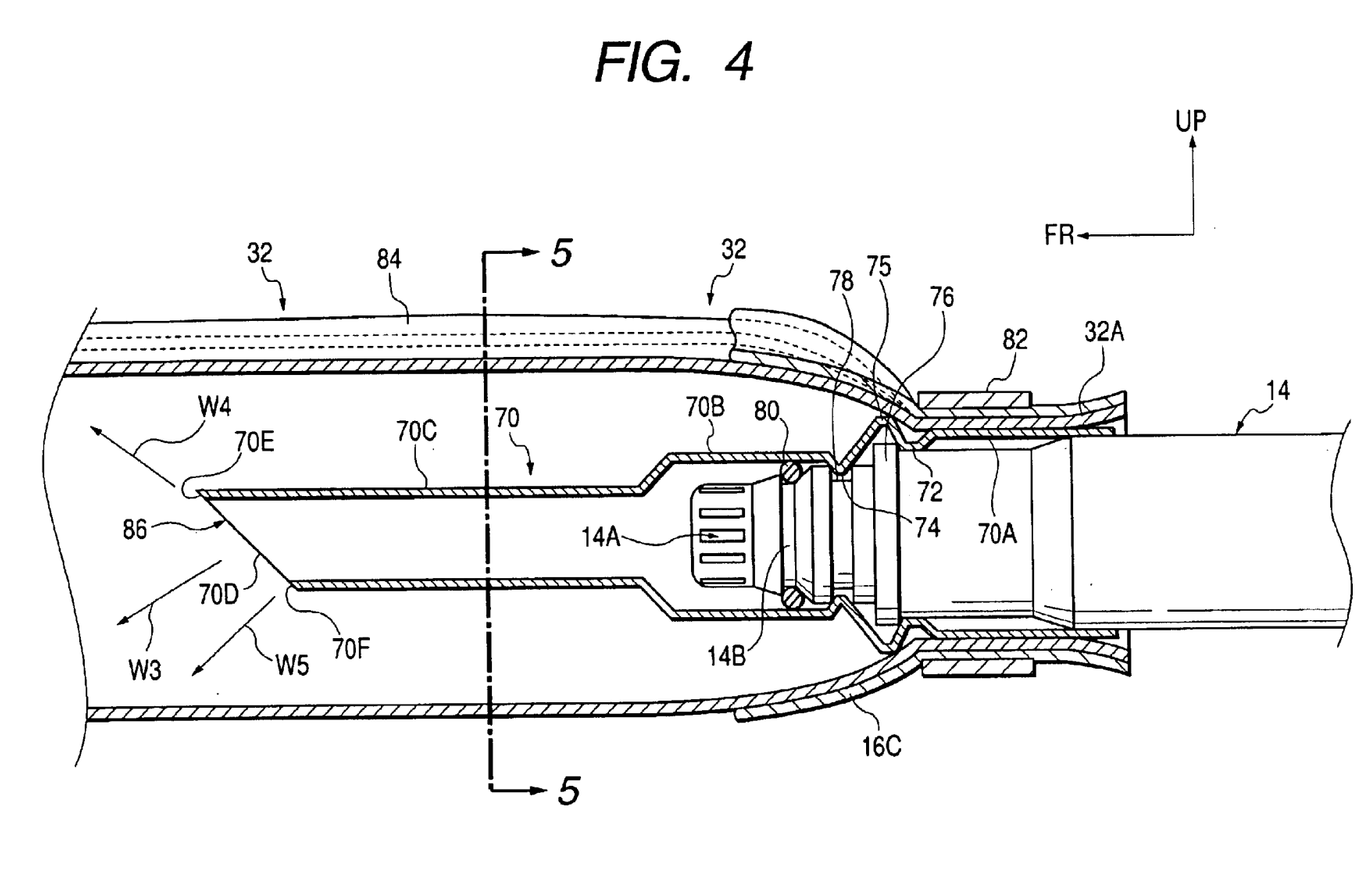
FIG. 4 is a sectional side view showing a main portion in a head protecting air bag device according to a second embodiment of the invention.

Next, a second embodiment of the head protecting air bag device of the invention will be described with reference to FIGS. 4 and 5.

The same members as the members in the first embodiment are denoted by the same reference characters, and their description is omitted.

Figure 5:
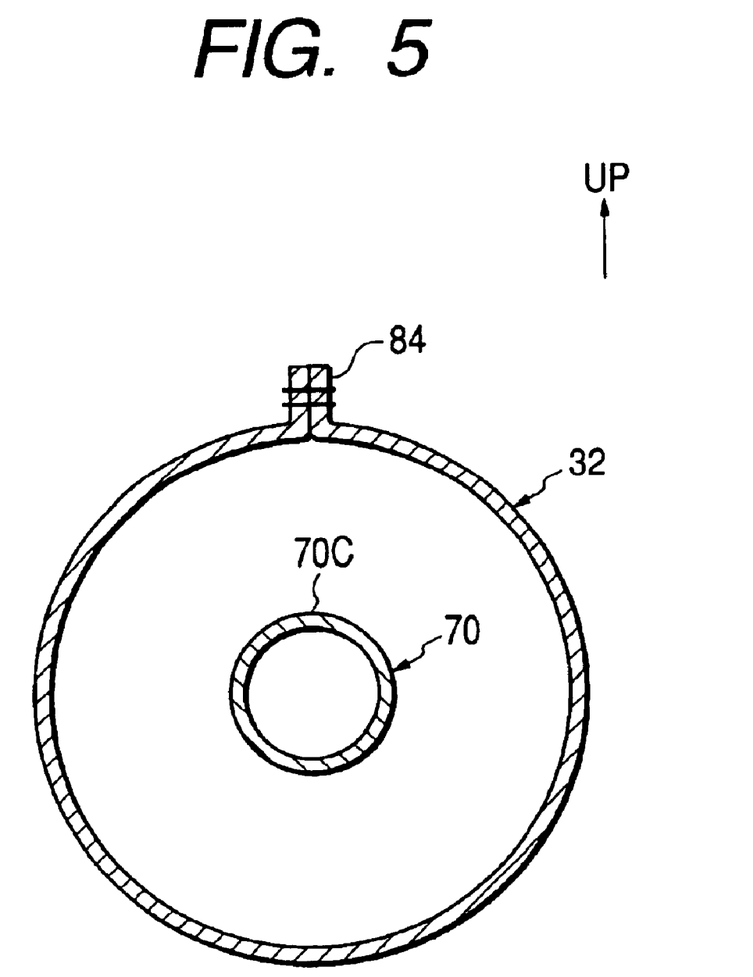
FIG. 5 is a sectional view taken along a line of 5—5 in FIG. 4.

As shown in FIG. 5, in this embodiment, a sewed portion 84 of an inner tube 32 is formed above a pipe 70 in a state where a head protecting air bag device 10 is mounted on the vehicle body. Further, as shown in FIG. 4, at a leading end outlet 70D of the pipe 70, a cut portion 86 functioning as a deflecting portion is formed.

This cut portion 86 is formed by slantingly cutting the pipe 70 from a leading end upper portion 70E to a leading end lower portion 70F, so that the ejection (shown by an arrow W3 in FIG. 4) of the expansion gas from the leading end outlet 70D of the pipe 70 is directed to the opposite side to the sewed portion 84 of the inner tube 32, that is, to the slant downside.

Next, the working of this embodiment will be described.

This embodiment, in addition to the working effect in the first embodiment, has the following working effect. Namely, since the sewed portion 84 side of the inner tube 32 is weak in tear strength due to the existence of machine stitches. Therefore, the cut portion 86 formed at the leading end outlet 70D of the pipe 70 directs the ejection (shown by the arrow W3 in FIG. 4) of the expansion gas from the leading end outlet 70D of the pipe 70 to the opposite side to the sewed portion 84 of the inner tube 32, that is, to the slant downside. In result, the amount of the gas ejection in the direction of the sewed portion 84 (shown by an arrow W4 in FIG. 4) is suppressed compared with the amount of the gas ejection in the lower direction (shown by an arrow W5 in FIG. 4). Therefore, damaging on the sewed portion 84 side that is weak in the tear strength can be reduced effectively.

Further, in this embodiment, such the small modification that the leading end outlet 70D of the pipe 70 is cut slantingly is only performed.

In this embodiment, the cut portion 86 functioning as the deflecting unit is formed at the leading end outlet 70D of the pipe 70. However, the deflecting portion is limited to the cut portion 86 but may be another member such as a deflection plate as long as it can direct the ejection of the expansion gas from the leading end outlet 70D of the pipe 70 to the opposite side to the sewed portion 84 of the inner tube 32.

Next, a third embodiment of the head protecting air bag device of the invention will be described with reference to FIG. 6.

The same members as the members in the first embodiment are denoted by the same reference characters, and their description is omitted.

Figure 6:
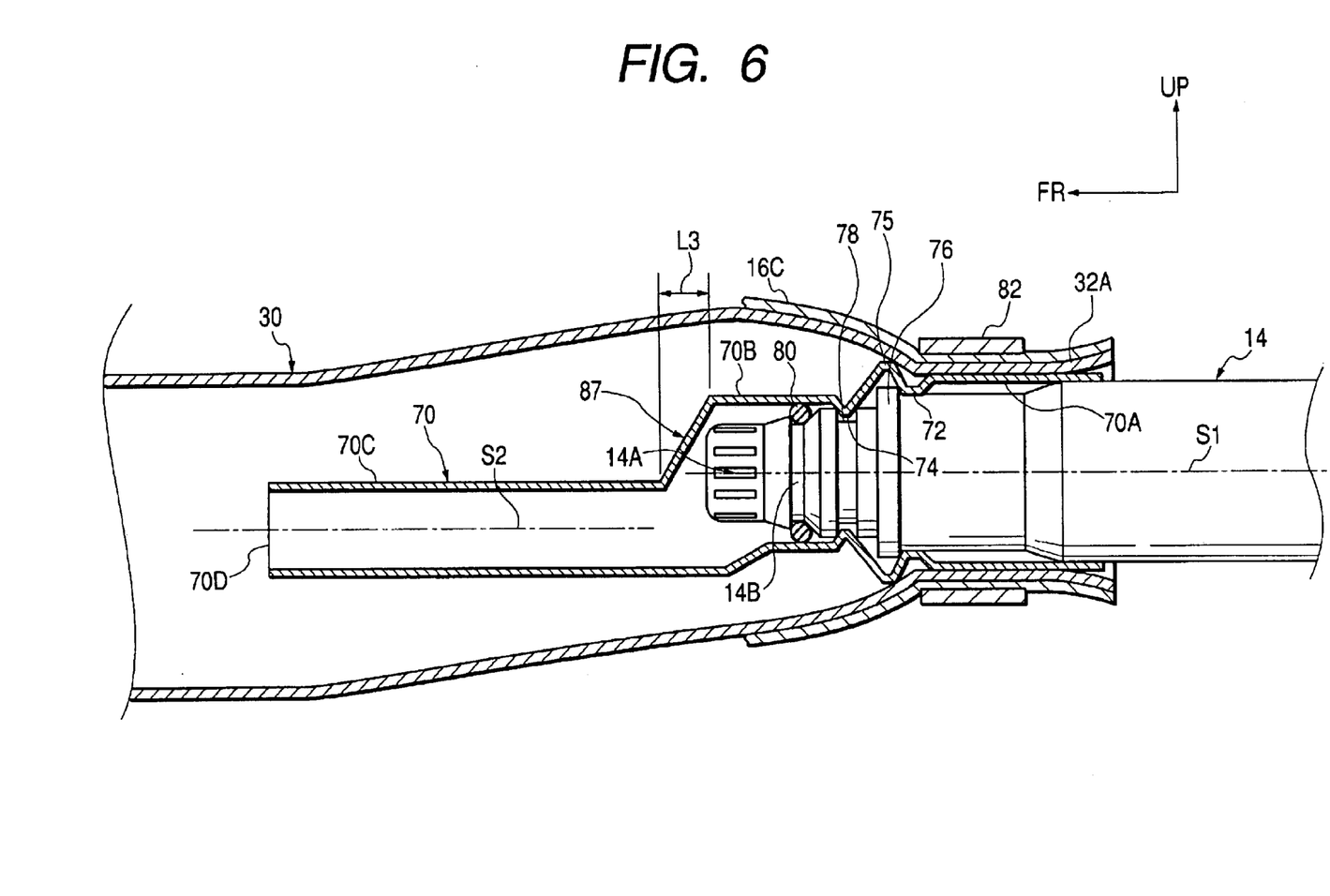
FIG. 6 is a sectional side view showing a main portion in a head protecting air bag device according to a third embodiment of the invention.

As shown in FIG. 6, in this embodiment, an axis S1 of an inflator 14 in a mounting position to the vehicle body is offset with respect to an axis S2 of a leading end 70C of a pipe 70 in vertical direction. In order to complement this offset, a bending portion 87 is formed at the pipe 70. Further, the bending portion 87 of the pipe 70 is formed near a gas ejection port 14A of the inflator 14.

Next, the working of this embodiment will be described.

Figure 7:
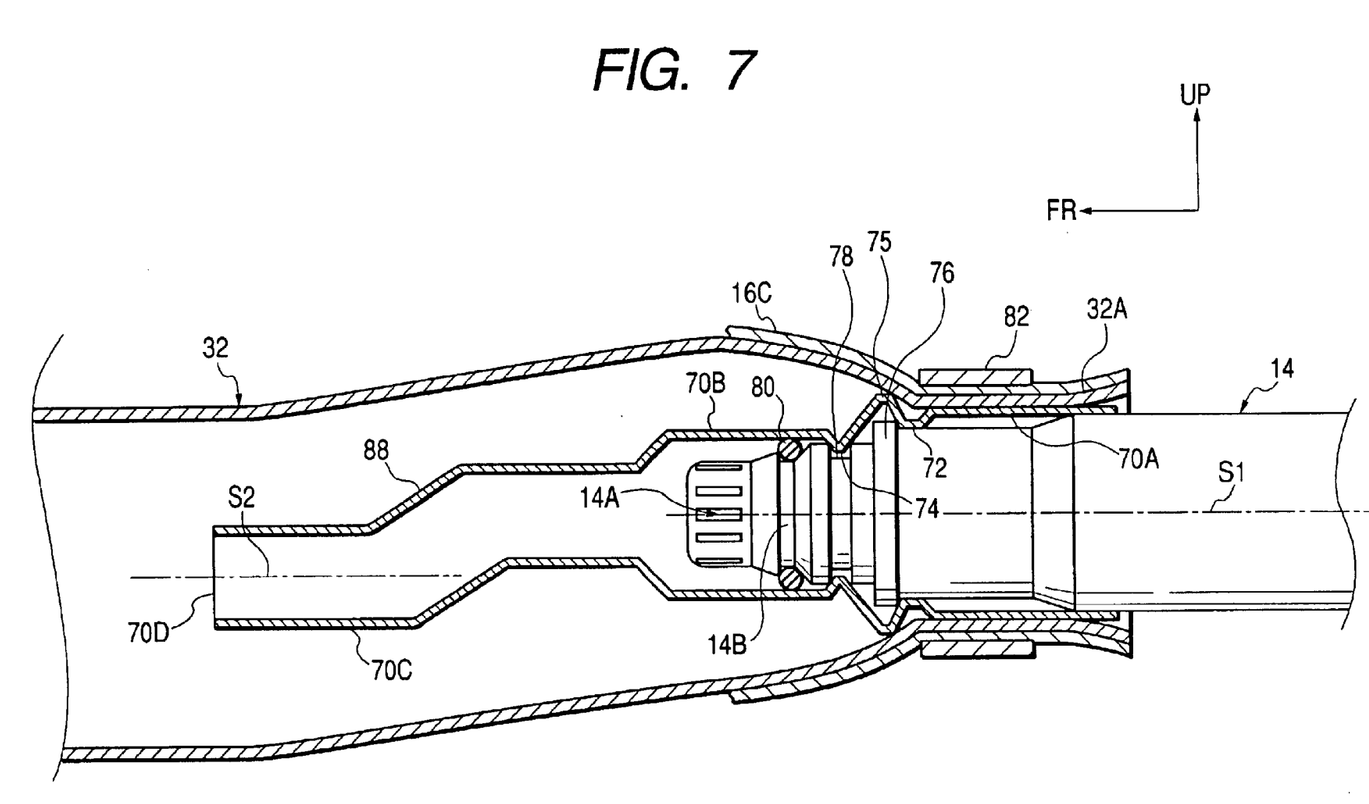
FIG. 7 is a sectional side view showing a main portion in a head protecting air bag device according to a comparative example in the third embodiment of the invention.

In case that the axis S1 of the inflator 14 in the mounting position is offset with respect to the axis S2 of the leading end 70C of the pipe 70 in vertical direction and their axes are not on a line, it is necessary to bend the pipe 70. Therefore, as a compared example shown in FIG. 7, it is thought that a bending portion 88 is formed at a central portion in the longitudinal direction of a leading end 70C of a pipe 70. In this case, when expansion gas is ejected, a loss in pressure at the bending portion 88 becomes large, which is disadvantageous to secure an expansion development time of a bag body 16 and the inner pressure in the bag body 16.

On the contrary, in this embodiment, as shown in FIG. 6, the bending portion 87 of the pipe 70 is formed near the gas ejection port 14A of the inflator 14. In result, in case that the expansion gas is ejected, the loss in pressure at the bending portion 87 becomes smaller than that in the comparative example in FIG. 7, whereby the loss in pressure caused by bending of the pipe 70 can be reduced. Therefore, this is advantage to secure the expansion development time of the bag body 16 and the inner pressure in the bag body 16. Further, it is preferable that a length L3 of the bending portion 87 from the gas ejection port 14A of the inflator 14 is within 20 mm (L3≦20 mm), since the pressure loss is almost the same as the pressure loss in case of the pipe having no offset.

Next, a fourth embodiment of the head protecting air bag device of the invention will be described with reference to FIG. 8.

The same members as the members in the first embodiment are denoted by the same reference characters, and their description is omitted.

Figure 8:
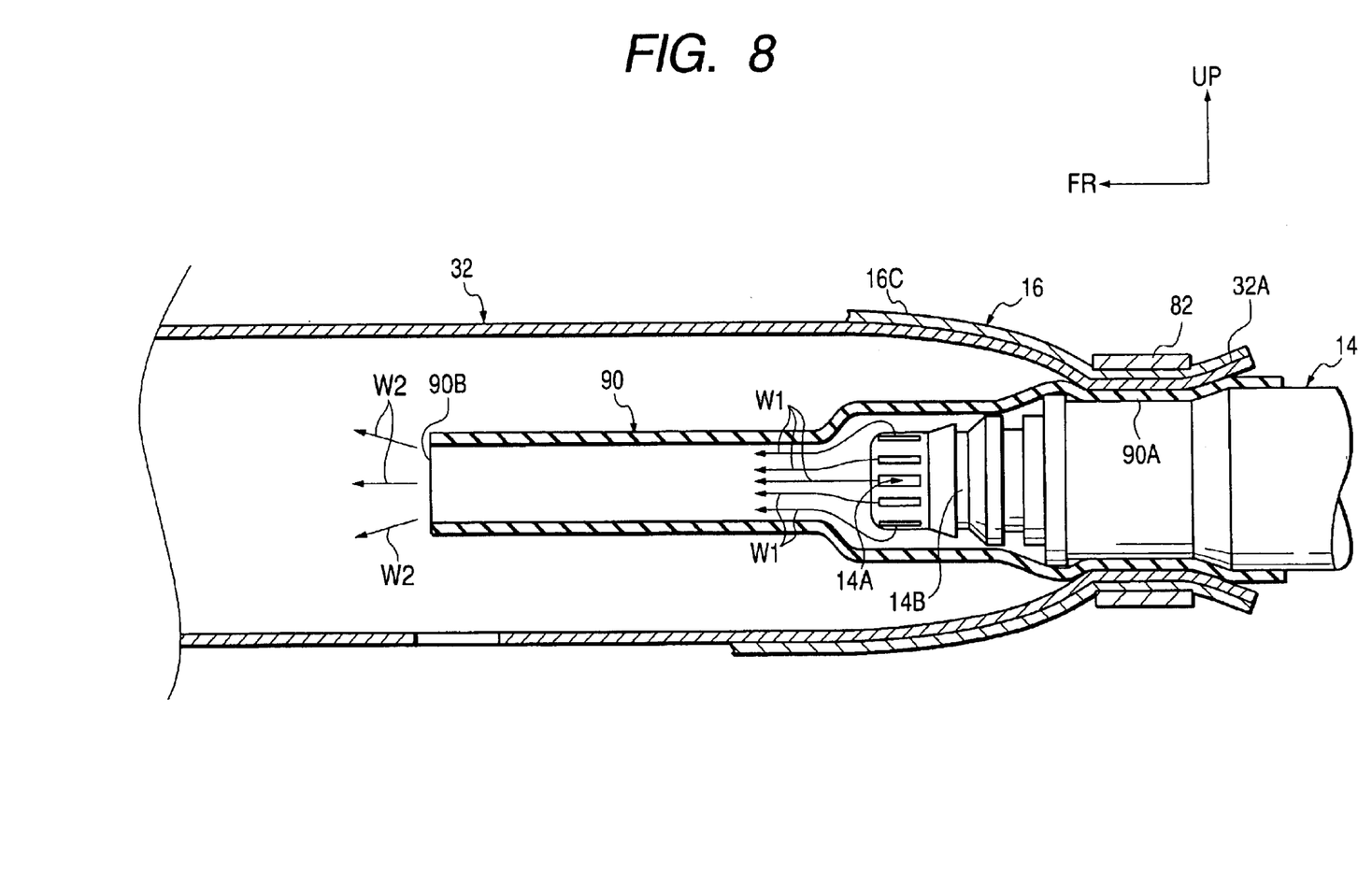
FIG. 8 is a sectional side view showing a main portion in a head protecting air bag device according to a fourth embodiment of the invention.

As shown in FIG. 8, in this embodiment, in place of the pipe 70 in the first embodiment, which is smaller in the diameter, shorter and higher in rigidity (for example, which is made of metal) than the inner tube 32, a high-voltage resistant rubber tube 90 having a small length and a small diameter is provided, which functions as a high-voltage resistant flexible tube and protrudes axially from an inflator 14 into an inner tube 32. An inner diameter of the high-voltage resistant rubber tube 90 is smaller than an outer diameter of an ejection part of the inflator 14, and the tube 90 does not extend over a gas outlet hole 34 in the inner tube 32 which is nearest to the inflator 14.

Further, one end (rear end) 90A of this high-voltage resistant rubber tube 90 is fixed to the peripheral portion in the vicinity of an end on a gas ejection port 14A side of the inflator 14. At the peripheral portion of the rear end 90A of the high-voltage resistant rubber tube 90, a rear leading end 32A of the inner tube 32 is clamped by a clamp 82, and also the vicinity of the upper edge rear end of the bag body 16 is simultaneously clamped. Further, the high-voltage resistant rubber tube 90 is manufactured by extruding a hose made of rubber reinforced with fibers or thermoplastic, thereafter cutting its hose in the predetermined length, and enlarging the diameter of its one end.

Next, the working of this embodiment will be described.

In this embodiment, when the inflator 14 operates, the expansion gas from the inflator 14, as shown by the arrow W in FIG. 2, passes through the inner tube 32 and is supplied through each gas outlet hole 34 to each of expansion rooms 50, 52, 54, 56, 58, 60, 62 and 64 of a bag body 16. In result, the bag body 16, as shown by the chain double dotted lines in FIG. 3, develops in the shape of a curtain thereby to protect a head 19A of an occupant 19.

At this time, by the high-voltage resistant rubber tube 90 provided in the inner tube 32, the expansion gas (shown by an arrow W1 in FIG. 8) ejected from the gas ejection port 14A in the inflator 14 is rectified. In result, the inner tube 32 folded is easily spread by the expansion gas and the diffusion of the expansion gas (shown by an arrow W2 in FIG. 8) becomes weaker at an outlet 90B of the high-voltage resistant rubber tube 90 than at the gas ejection port 14A of the inflator 14. Therefore, since it is possible to prevent the inner pressure of the inner tube 32 in the vicinity of the outlet 90B of the high-voltage resistant rubber tube 90 from temporarily increasing very much, damaging of the inner tube 32 can be reduced.

Further, since the high-voltage resistant rubber tube 90 is used, the rubber tube 90 can be folded up in flat, so that deterioration of the convenience of housing the bag body 16 can be further suppressed.

Next, a fifth embodiment of the head protecting air bag device of the invention will be described with reference to FIG. 9.

The same members as the members in the first embodiment are denoted by the same reference characters, and their description is omitted.

Figure 9:
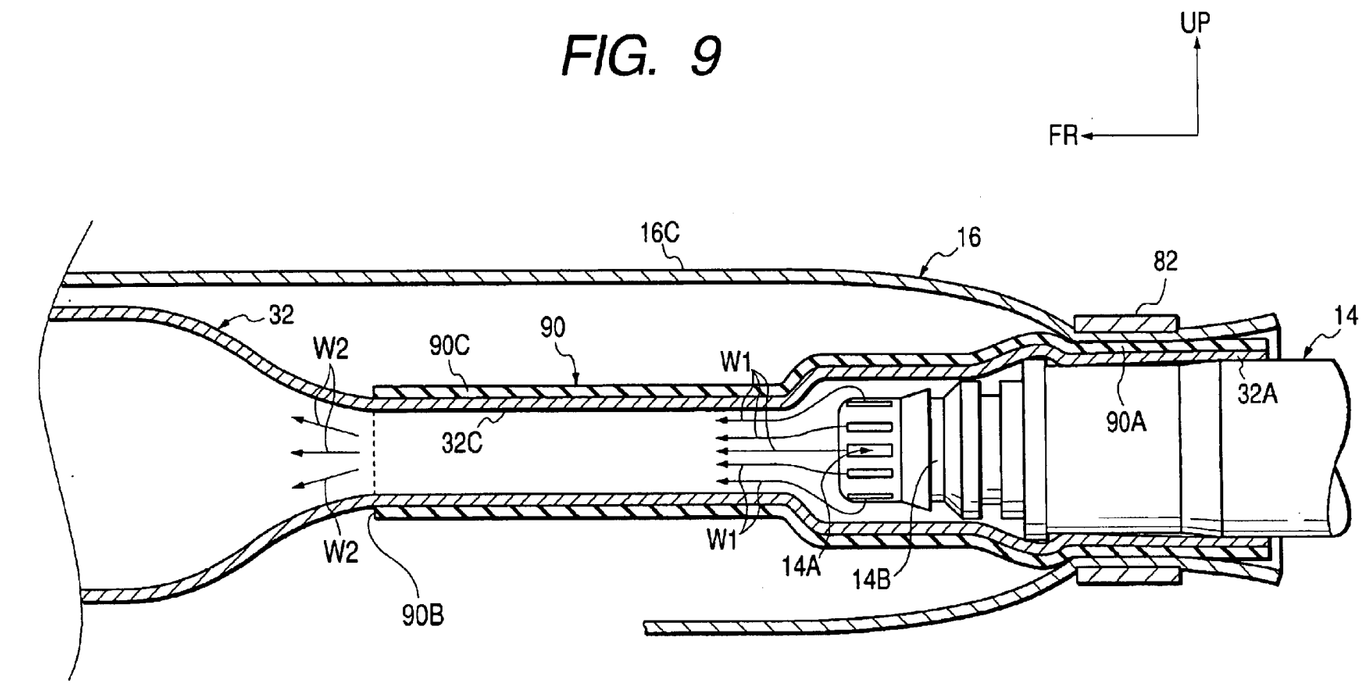
FIG. 9 is a sectional side view showing a main portion in a head protecting air bag device according to a fifth embodiment of the invention.

As shown in FIG. 9, in this embodiment, in place of the pipe 70 in the first embodiment, which is smaller in the diameter, shorter and higher in rigidity (for example, which is made of metal) than the inner tube 32, a high-voltage resistant rubber tube 90 having a small length and a small diameter is provided, which protrudes axially from an inflator 14 into an inner tube 32. An inner diameter of the high-voltage resistant rubber tube 90 is smaller than an outer diameter of the ejection part of the inflator 14, and the tube 90 does not extend over a gas outlet hole 34 in the inner tube 32 which is nearest to the inflator 14.

Further, one end (rear end) 90A of this high-voltage resistant rubber tube 90 is fixed to the peripheral portion in the vicinity of the end on a gas ejection port 14A side of the inflator 14. At the inner portion of the rear end 90A of the high-voltage resistant rubber tube 90, a rear leading end 32A of the inner tube 32 is clamped by a clamp 82. Further, at the peripheral portion of the rear end 90A of the high-voltage resistant rubber tube 90, the vicinity of the upper edge rear end of a bag body 16 is simultaneously clamped by the clamp 82.

Accordingly, in this embodiment, a part 32C of the inner tube 32 which is near the inflator 14 is covered with a leading end 90C of the high-voltage resistant rubber tube 90, and this part is narrowed. Further, the high-voltage resistant rubber tube 90 is manufactured by extruding a hose made of rubber reinforced with fibers or thermoplastic, thereafter cutting its hose in the predetermined length, and enlarging the diameter of its one end.

Next, the working of this embodiment will be described.

In this embodiment, when the inflator 14 operates, the expansion gas from the inflator 14, as shown by the arrow W in FIG. 2, passes through the inner tube 32 and is supplied through each gas outlet hole 34 to each of expansion rooms 50, 52, 54, 56, 58, 60, 62 and 64 of a bag body 16. In result, the bag body 16, as shown by the chain double dotted lines in FIG. 3, develops in the shape of a curtain thereby to protect a head 19A of an occupant 19.

At this time, since the part 32C of the inner tube 32 which is near the inflator 14 is covered with the leading end 90C of the high-voltage resistant rubber tube 90, and this part 32C is narrowed, the expansion gas (shown by an arrow W1 in FIG. 9) ejected from the gas ejection port 14A in the inflator 14 is rectified. In result, the inner tube 32 is easily spread folded by the expansion gas and the diffusion of the expansion gas (shown by an arrow W2 in FIG. 9) becomes weaker at an outlet 90B of the high-voltage resistant rubber tube 90 than at the gas ejection port 14A of the inflator 14. Therefore, since it is possible to prevent the inner pressure of the inner tube 32 in the vicinity of the outlet 90B of the high-voltage resistant rubber tube 90 from temporarily increasing very much, damaging of the inner tube 32 can be reduced.

Further, since the high-voltage resistant rubber tube 90 is used, the rubber tube 90 can be folded up in flat, so that deterioration of the convenience of housing the bag body 16 can be further suppressed.

Further, since the inner tube 32 is covered with the high-voltage resistant rubber tube 90 so that the inner tube 32 is narrowed, the high-voltage resistant rubber tube 90 is not directly exposed to the expansion gas from the inflator 14 by the inner tube 32 located inside. As a result, since high-temperature resistance of the high-voltage resistant rubber tube 90 can be lowered, a cost can be reduced.

Figure 10:
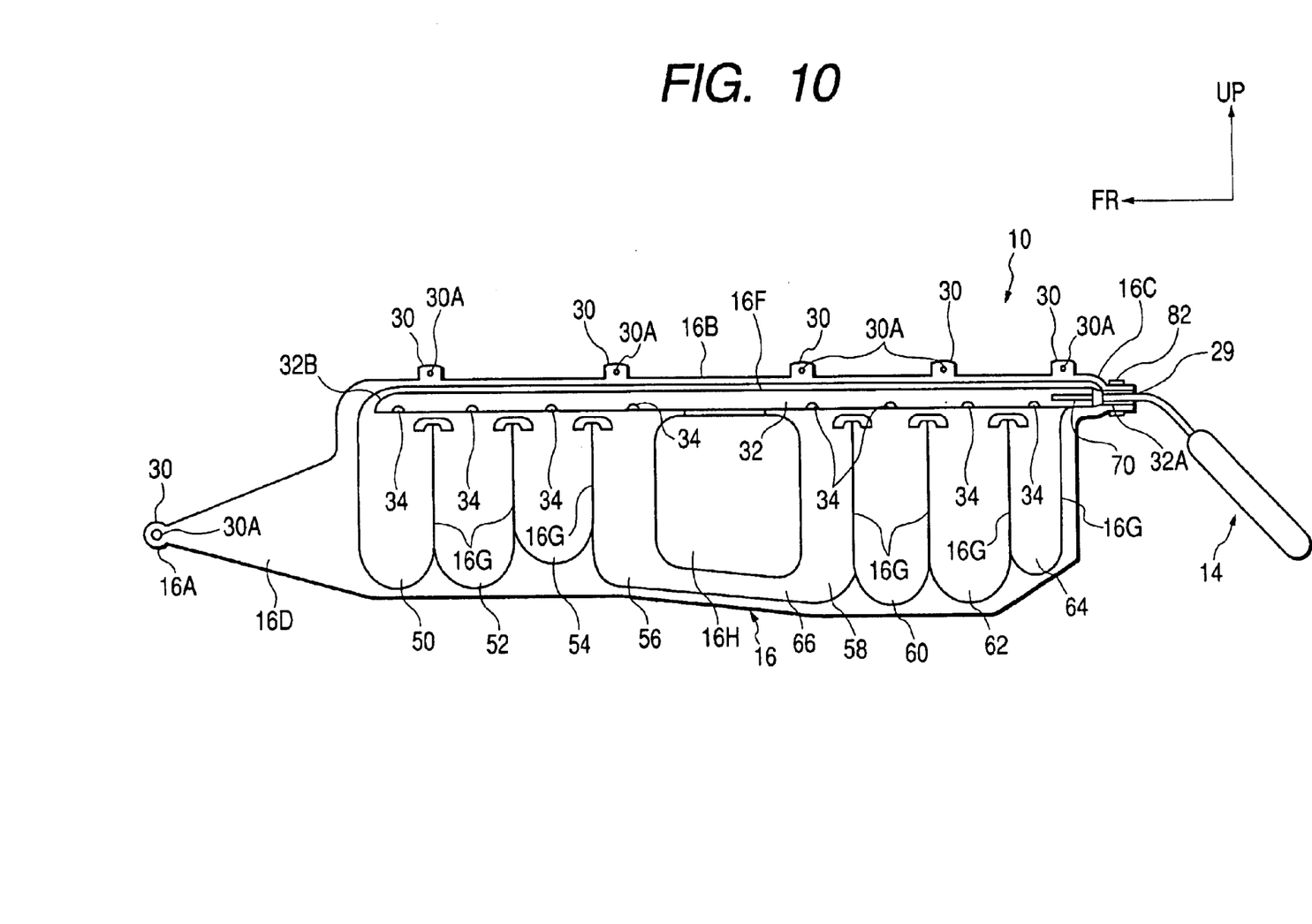
FIG. 10 is a sectional side view showing a bag body in a head protecting air bag device according to another embodiment of the invention.

Although the invention has been described above in detail in the specific embodiments, it is not limited to these embodiments but it will be obvious to those skilled in the art that other various embodiments may be possible within the scope of the invention. For example, in the above each embodiment, the inflator 14 is arranged along the axis of the inner tube 32 in the forward and backward direction of the vehicle body as shown in FIG. 2. However, in place of this arrangement, the inflator 14 may be mounted on a C-pillar (quarter pillar) with its vehicle backside inclined downward as shown in FIG. 10 as long as the pipe 70 is extended upward and bent forward. Namely, even if the pipe 70 is thus bent, as long as the dimensional relation between L1 and L2 shown in FIG. 1 is satisfied, damaging of the inner tube 32 in the vicinity of the gas ejection port of the inflator 14 can be reduced while the pressure loss of the expansion gas is kept small. Further, to thus bend the pipe 70 makes large the free degree of the mounting position of the inflator 14, so that the inflator can be mounted correspondingly to the shape of the vehicle body.

Figure 11:
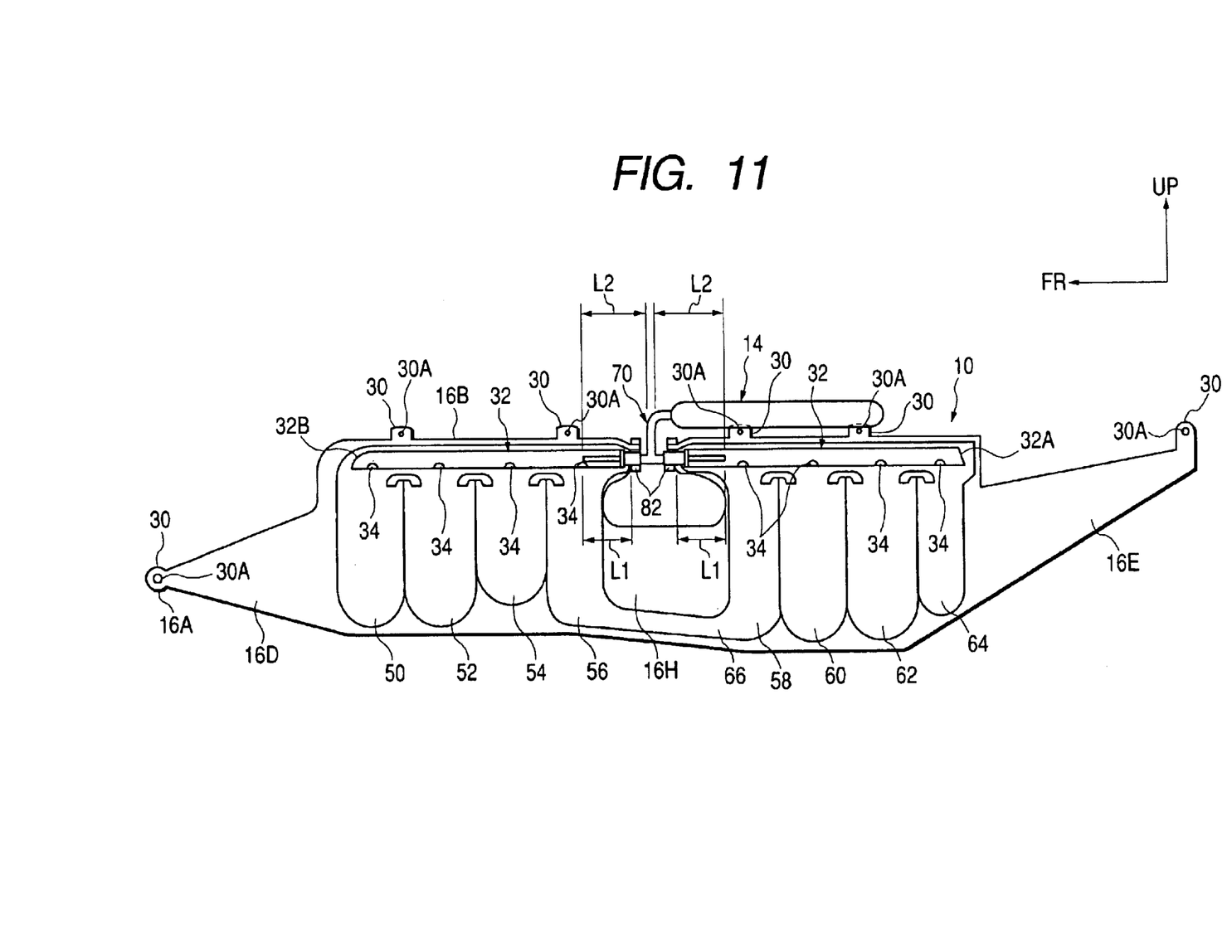
FIG. 11 is a sectional side view showing a bag body in a head protecting air bag device according to another embodiment of the invention.

Further, the invention, as shown in FIG. 11, can be also applied to a head protecting air bag device in which an inflator 14 is coupled to a central portion of an upper end edge of a bag body 16 in the longitudinal direction, that is, to a central portion of an inner tube 32 in the forward and backward direction, and both a rear leading end 32A and a front leading end 32B of the inner tube 32 are blocked up.

In this case, for example, the inflator 14 is mounted on the central part of a roof side rail 28 and the pipe 70 is formed in the shape of a reverse T (or reverse J), whereby the invention can be applied to this head protecting air bag device. Namely, even if the pipe 70 is thus formed, as long as a dimensional relation between L1 and L2 in each of coupling portions of the pipe 70 to a front seat expansion part of the bag body and to a back seat expansion part of the bag body satisfies the dimensional relation between L1 and L2 shown in FIG. 1, damaging of the inner tube 32 in the vicinity of the gas ejection port of the inflator 14 can be reduced while the pressure loss of the expansion gas is kept small. Further, by thus forming the pipe 70, the gas can be supplied in a short time to both the front seat expansion part and the rear seat expansion part of the bag body 16.

Further, the invention can be applied also to a head protecting air bag device in which an inflator 14 is provided for another part such as an A-pillar.

Further, the head protecting air bag device of the invention can be applied also to a vehicle having three or more rows of seats.

According to the first aspect of the invention, in a head protecting air bag device comprising an inflator which ejects expansion gas in a bag body, a gas passage which communicates to expansion rooms for protecting a head of an occupant and the upsides of the expansion rooms and extends in the longitudinal direction of a vehicle body, and a flexible inner tube, which is provided in the gas passage and supplies the expansion gas into the expansion rooms, there is provided a pipe having a small length and a small diameter, which is coupled to a gas ejection port of the inflator, protrudes into the inner tube at its leading end, and extends in the axial direction of the inner tube. Therefore, there is a superior advantage that damaging of the inner tube in the vicinity of the gas ejection port in the inflator can be reduced.

According to the second aspect of the invention, in the head protecting air bag device according to the first aspect, there is provided a deflecting portion which deflects the ejecting direction of the expansion gas ejecting from a leading end of the pipe to the opposite side to a sewed portion of the inner tube. Therefore, in addition to the advantage of the first aspect, there is a superior advantage that damaging of the sewed portion that is weak in the tear strength can be effectively reduced.

According to the third aspect of the invention, in the head protecting air bag device according to the second aspect, the deflecting portion is the leading end of the pipe cut slantingly. Therefore, there is a superior advantage that by such a small modification, damaging of the sewed portion side that is weak in the tear strength can be reduced effectively.

According to the fourth aspect of the invention, in the head protecting air bag device according to the first aspect, an axis of the inflator in the mounting position is offset with respect to an axis of the leading end of the pipe in vertical direction, and a bending portion is formed at a part of the pipe that is near the gas ejection port of the inflator. Therefore, in addition to the advantage of the first aspect, there is a superior advantage that the pressure loss caused by bending of the pipe can be reduced.

According to the fifth aspect of the invention, in a head protecting air bag device comprising an inflator which ejects expansion gas in a bag body, a gas passage which communicates to expansion rooms for protecting a head of an occupant and the upsides of the expansion rooms and extends in the longitudinal direction of a vehicle body, and a flexible inner tube, which is provided in the gas passage and supplies the expansion gas into the expansion rooms, there is provided a high-voltage resistant flexible tube having a small length and a small diameter is provided, which protrudes axially from the inflator into the inner tube. Therefore, there are superior advantages that damaging of the inner tube in the vicinity of the gas ejection port of the inflator can be reduced, and that deterioration of the convenience of housing the bag body in the device can be further suppressed.

According to the sixth aspect of the invention, in a head protecting air bag device comprising an inflator which ejects expansion gas in a bag body, a gas passage which communicates to expansion rooms for protecting a head of an occupant and the upsides of the expansion rooms and extends in the longitudinal direction of a vehicle body, and a flexible inner tube, which is provided in the gas passage and supplies the expansion gas into the expansion rooms, there is provided a high-voltage resistant flexible tube having a small length and a small diameter is provided, which protrudes axially from the inflator into the gas passage in the bag body, and the inner tube is covered with the high-voltage resistant flexible tube and narrowed. Therefore, there are superior advantages that damaging of the inner tube in the vicinity of the gas ejection port of the inflator can be reduced, and that deterioration of the convenience of housing the bag body in the device can be further suppressed. Further, since high-temperature resistance of the high-voltage resistant flexible tube can be lowered, there is a superior advantage that a cost can be reduced.

According to the seventh aspect of the invention, in the head protecting air bag device according to any of the first to sixth aspects, an inner diameter of the pipe having the small length and the small-diameter or the high-voltage resistant flexible tube is smaller than an outer diameter of the ejection part of the inflator, and the pipe or the tube does not extend over a gas outlet hole in the inner tube that is nearest to the inflator. Therefore, in addition to the advantage of any of the first to sixth aspects, there is a superior advantage that the expansion gas can be reliably blown also into the gas outlet hole in the inner tube that is nearest to the inflator.

What is claimed is:

1. An air bag device comprising:
    a bag body having at least one expansion chamber and a gas passage extending in a longitudinal direction of a vehicle body and communicating with the at least one expansion chamber;
    an inflator ejecting an expansion gas in the bag body through a gas ejection port;
    a flexible inner tube provided in the gas passage and supplying the expansion gas into the expansion chamber through at least one gas outlet hole; and
    a pipe coupled to the gas ejection port and extending in an axial direction of the flexible inner tube, the pipe including a leading end protruding into the inner tube,
    wherein an inner diameter of the pipe is less than an outer diameter of the gas ejection port, and a length of the pipe is less than a distance between a rear end of the pipe and the at least one gas outlet hole, and wherein the inner diameter of the pipe becomes less at a predetermined point along the length thereof and remains less along the length thereof from the predetermined point to the leading end.

2. The air bag device according to claim 1, wherein the leading end of the pipe includes a deflecting portion to deflect the expansion gas from a first ejecting direction to a second direction on an opposite side of a sewed portion provided on the inner tube.

3. The air bag device according to claim 2, wherein the leading end of the pipe is slanted to form the deflecting portion.

4. The air bag device according to claim 1, wherein a first axis of the inflator at the mounting position of the pipe and a second axis of the leading end of the pipe are offset from each other to form a bending portion at a part of the pipe near the gas ejection port of the inflator.

5. An airbag device according to claim 1, wherein the inner diameter of the pipe at the predetermined point is set to determine a pressure associated with the expansion gas in a vicinity of the gas ejection port.

6. An airbag device according to claim 1, wherein the inner diameter of the pipe is changed at the predetermined point to modulate a pressure associated with the expansion gas in a vicinity of the gas ejection port.

7. An airbag device according to claim 1, wherein the pipe is rigid relative to the inner tube.

8. An airbag device according to claim 1, wherein the pipe is thinner at the leading end than at the rear end thereof.

* * * * *